United States Patent [19]
Holzmann

[11] 3,807,585
[45] Apr. 30, 1974

[54] SELF-PROPELLED PIPE CART

[76] Inventor: Paul Holzmann, Rt. 3, Box 151, South Haven, Mich. 49090

[22] Filed: Oct. 11, 1972

[21] Appl. No.: 296,615

[52] U.S. Cl.................. 214/84, 180/19 R, 214/1 P
[51] Int. Cl............................................. B60p 1/52
[58] Field of Search................ 180/19 H, 19 R, 6.2; 280/63; 214/1 P, 1 PA, 84; 193/35 R

[56] References Cited
UNITED STATES PATENTS

| 3,034,668 | 5/1962 | Wicks | 214/1 PA |
| 2,846,018 | 8/1958 | Puckett | 180/6.2 |
| 1,301,428 | 4/1919 | Gitterman | 193/35 R |
| 2,832,608 | 4/1958 | Martineau | 280/63 |

Primary Examiner—David Schonberg
Assistant Examiner—John A. Pekar
Attorney, Agent, or Firm—Gordon W. Hueschen

[57] ABSTRACT

Self-propelled pipe cart adapted to carry lengths of pipe comprises a frame having a platform and wheels mounted on said frame. Each wheel is driven by a separate hydraulic motor, preferably mounted on a floating axle.

6 Claims, 5 Drawing Figures

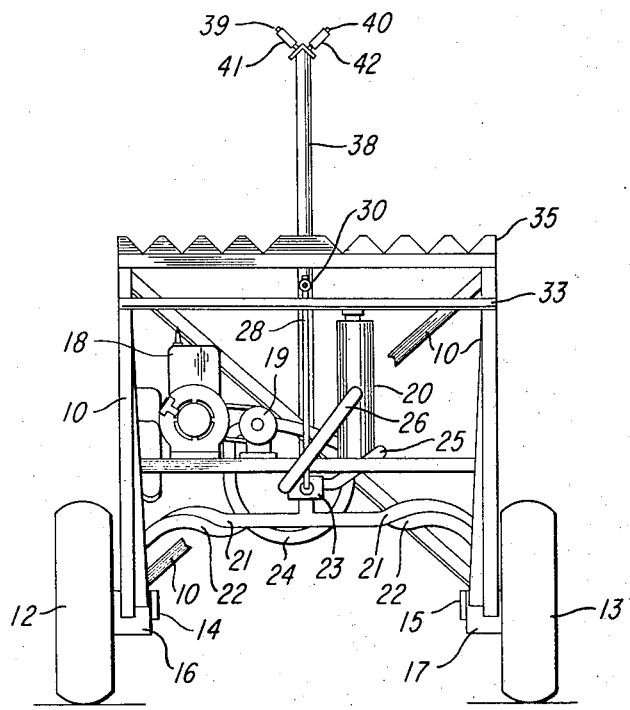
figure 3
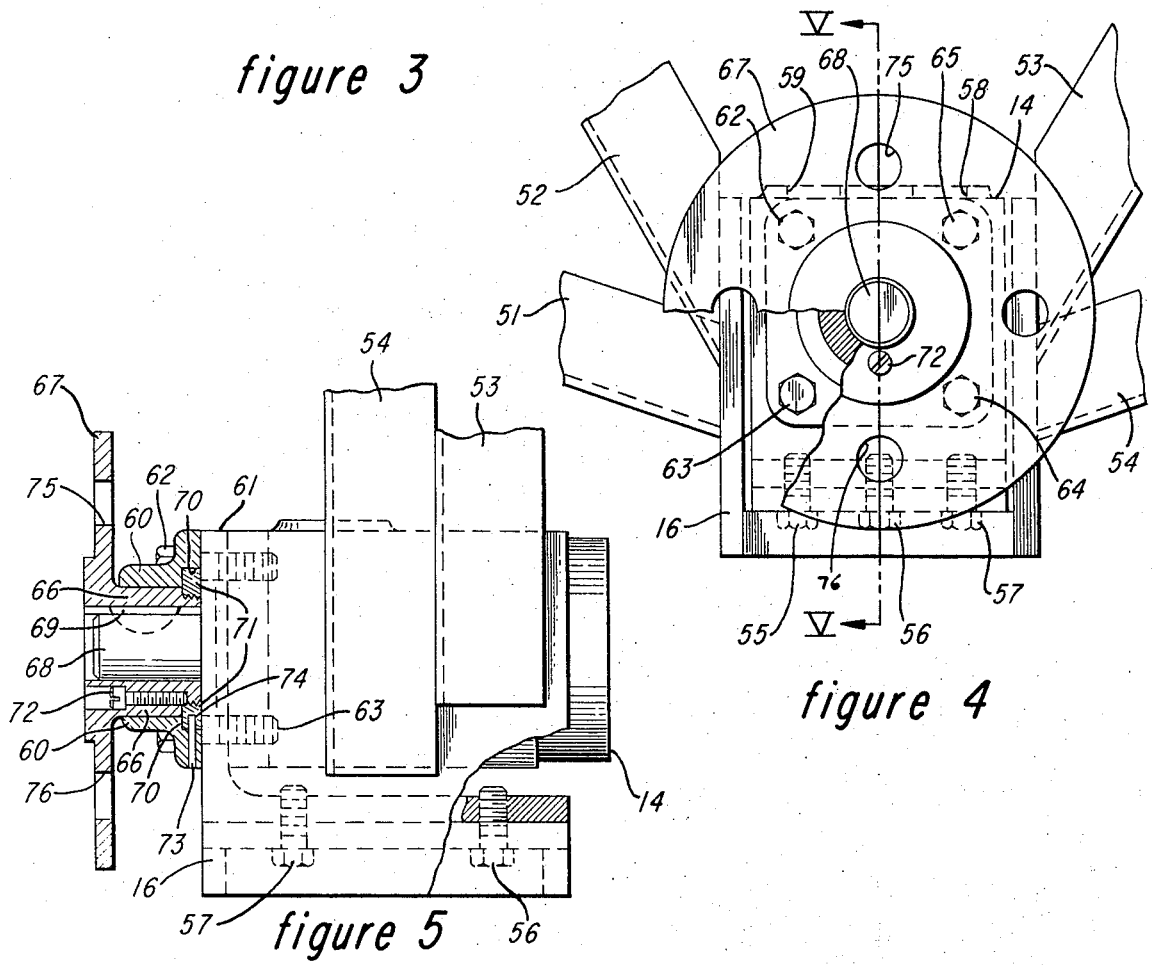
figure 4
figure 5

SELF-PROPELLED PIPE CART

BACKGROUND OF THE INVENTION

Transportation of long pieces of pipe is often difficult due to the unwieldy nature of the items to be carried. This is particularly so with irrigation pipe, sections of which are about 30 feet long and which must be transported over the relatively uneven terrain of a farm field and where movement is restricted due to the presence of crop plantings. For example, in a blueberry plantation, irrigation pipe in about 30-foot sections must be carried through the relatively narrow pathways between rows of blueberry bushes.

Heretofore, irrigation pipe under such conditions was transported manually, with one person carrying one or two of such 30-foot sections. The inefficiency of such a mode of transportation is self-evident, yet the pathways in a blueberry field are so narrow that a farm tractor-trailer combination cannot be driven through without substantial damage to the bushes.

It is an object of this invention to provide a self-propelled pipe cart particularly suitable for field use and which can carry 20 or more 30-foot section of conventional irrigation pipe. It is another object to provide a self-propelled pipe cart which is readily maneuverable, equally mobile in both forward and reverse directions, and which can be easily operated by one person. Still other objects will readily present themselves to one skilled in the art upon reference to the ensuing specification, the drawings, and the claims.

SUMMARY OF THE INVENTION

The present invention contemplates an elongated frame having a platform adapted to receive and carry lengths of pipe, and a pair of hydraulically-driven wheels mounted on said frame. Each driven wheel is provided with a separate hydraulic motor which is activated by a suitable prime mover, such as a gasoline engine, carried on the frame.

BRIEF DESCRIPTION OF THE DRAWINGS

In the drawings,

FIG. 3 is an end view of the cart shown in FIG. 1 partly broken away to show detail;

FIG. 4 is a front elevational view of a wheel mounting assembly; and

FIG. 5 is a side elevational view of the wheel mounting assembly shown partly in section taken along line V — V of FIG. 4.

DESCRIPTION OF THE PREFERRED EMBODIMENTS

Figure 1:
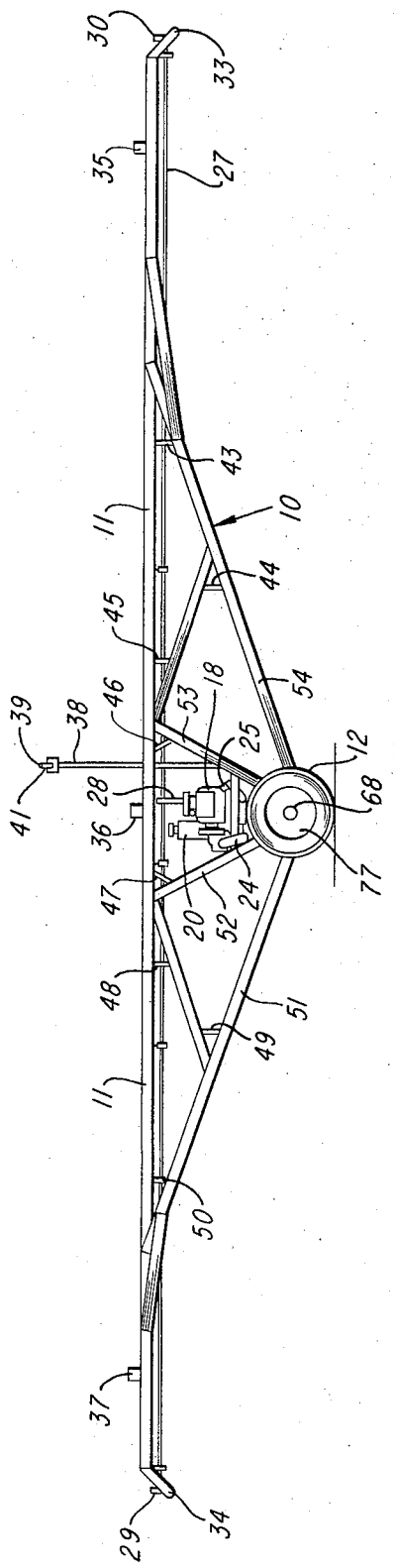
FIG. 1 is a side elevational view of a self-propelled pipe cart of this invention.

Referring to FIG. 1, a self-propelled pipe cart of this invention comprises elongated frame 10, the upper portion of which defines platform 11 which is adapted to receive and carry lengths of pipe. Axially-aligned wheels 12 and 13 (FIGS. 1 and 2) are rotatably affixed to frame 10 and driven by hydraulic motors 14 and 15 housed in mounting boxes 16 and 17, respectively, (FIG. 3) which are integral with frame 10.

Prime mover means for hydraulic motors 14 and 15 is air-cooled gasoline engine 18 which drives gear pump 19 (FIG. 3) supplying hydraulic fluid under pressure to motors 14 and 15 from fluid reservoir 20. In a preferred embodiment of this invention, hydraulic motors 14 and 15 are connected in a parallel hydraulic circuit by pressure hoses 21 and 22 and regulated by three-way directional control valve 23 in a conventional manner. Hydraulic fluid is withdrawn from reservoir 20 via hose 24, is passed through pressure hose 25 to control valve 23, and then further on to hydraulic motors 14 and 15 through either hose 21 or hose 22, depending on the rotational direction desired for wheels 12 and 13. The other of these two aforementioned pressure hoses then serves as conduit for the return of hydraulic fluid to control valve 23 and to reservoir 20 via pressure hose 26.

Control valve 23 affords forward, reverse, and neutral positions and is mechanically linked by means of lever 28 to control rod 27 slidably mounted in frame 10, extending the full length of platform 11, and terminating in handles 29 and 30 on opposite ends of rod 27.

Throttling of engine 18 is achieved by means of throttle controls 31 and 32 which extend from engine 18 to opposite ends of platform 11.

To facilitate directional control of the cart, handle bars such as 33 and 34 are mounted on frame 10 at opposite ends of platform 11. It is preferable that handle bars 33 and 34 extend substantially the entire width of platform 11.

Elongated members or bars 35, 36 and 37 having a serrated upper edge are transversely mounted on platform 11 and in a spaced relationship relative to each other. These bars provide a convenient retaining means for the pipe loaded on platform 11.

To facilitate loading and unloading pipe from platform 11, Y-shaped member 38 is fixedly mounted on frame 10 and extends upwardly from a substantially central location on platform 11. Projecting arms 39 and 40 of member 38 are provided with rollers 41 and 42, respectively. As a length of pipe is unloaded, one end of the pipe is lifted up from platform 11, and the pipe is placed between rollers 41 and 42, and then easily pulled off platform 11.

Wheels 12 and 13 are located on frame 10 preferably so that the center of gravity of the entire cart is located approximately above the wheels. In this manner the cart is substantially balanced and can be readily manipulated by an operator.

Figure 2:
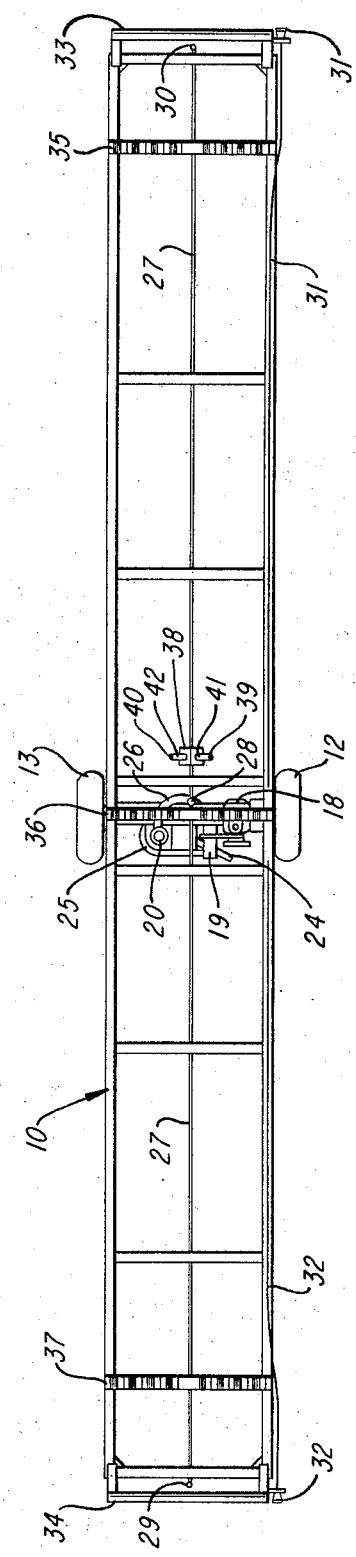
FIG. 2 is a top view of the cart shown in FIG. 1.

While frame 10 can be any rigid, three-dimensional structure capable of providing or supporting a platform from the standpoint of weight and rigidity, the structure shown in FIGS. 1 through 3 is preferred. When use of the cart of this invention in close proximity to relatively tall bushes, such as blueberry bushes for example, is contemplated, it is desirable to obviate sharp corners within frame 10 which could catch and damage outer branches of the bushes. To this end, auxiliary cross-members 43, 44, 45, 46, 47, 48, 49 and 50 can be welded onto frame 10 as shown in FIG. 1.

Ruts and uneven surfaces of a field subject drive shafts of hydraulic motors 14 and 15 to considerable stress and may result in a premature failure of motor bearings and seals. Therefore, it is preferred to mount wheels 12 and 13 using a "floating axle" as shown in FIGS. 4 and 5, by means of which stresses are transmitted to frame 10 rather than drive shafts of motors 14 and 15.

Referring to FIG. 4, mounting box 16 is welded or otherwise suitably affixed to members 51, 52, 53 and 54 of frame 10, and hydraulic motor 14 is secured therein by means of bolts 55, 56 and 57. Hydraulic fluid port 58 is adapted to receive pressure hose 22, and hydraulic fluid port 59 is adapted to receive pressure hose 21. Stationary hub 60 (FIG. 5) is secured to motor mounting plate 61 by bolts 62, 63, 64 and 65. Hollow axle 66 provided with wheel frange 67 is journalled within hub 60 and is engaged with drive shaft 68 of motor 14 in a torque-transmitting relationship by means of Woodruff key 69. Axle 66 can be journalled directly in hub 60 as shown, or a suitable bearing surface (not shown) may be interposed between axle 66 and hub 60 if desired.

Hub 60 is provided with annular recess 70 in the fae thereof adjacent to mounting plate 61, and internally threaded ring nut 71 is disposed therewithin. The innermost end of axle 66 is externally threaded and threadedly engages ring nut 71. Locking of the threads is achieved by lockscrew 72 situated within axle 66 parallel to the axis thereof and bearing against the mating threads of axle 66 and ring nut 71. Hub 60 is also provided with radial passageway 73 permitting access to the outer surface of ring nut 71 which is provided with recess 74 adapted to receive a locking pin (not shown) inserted through passageway 73. In this manner, ring nut 71 can be held stationary while axle 66 is engaged or disengaged therefrom. When axle 66 is engaged with ring nut 71, the latter retains axle 66 within hub 60 while permitting axial rotation.

Openings 75 and 76 in wheel flange 67 are adapted to receive conventional studs for mounting rim 77 of wheel 12 thereon.

The foregoing discussion and the drawings are intended as illustrative and are not to be considered as limiting. Still other variations and rearrangements of parts within the spirit and scope of this invention will readily present themselves to the skilled artisan.

I claim:

1. Self-propelled pipe cart which comprises
    elongated frame means having a platform adapted to receive and carry lengths of pipe;
    a Y-shaped member fixedly mounted on said frame, extending upwardly from a central position on said platform, and provided with rollers on the two projecting arms thereof;
    a pair of axially-aligned wheels rotatably affixed on said frame substantially centrally of said frame;
    a hydraulic motor mounted on said frame in the proximity of each wheel and driveably engaging said wheel;
    control means for said hydraulic motor; and
    prime mover means mounted on said frame and adapted to drive said hydraulic motor.

2. The pipe cart in accordance with claim 1 wherein the hydraulic motors are connected in a parallel hydraulic circuit and are adapted to be driven by a common prime mover means.

3. The pipe cart in accordance with claim 1 wherein a plurality of members having a serrated upper edge are transversely mounted on said platform.

4. The pipe cart in accordance with claim 1 wherein said frame is equipped with a handle bar at the end of said platform, said handle bar extending substantially the entire width of said platform.

5. The pipe cart in accordance with claim 1 wherein each driven wheel is mounted on a hollow axle journalled within a stationary hub mounted on said frame means and wherein drive shaft of said hydraulic motor engages said hollow axle in a torque-transmitting relationship.

6. The pipe cart in accordance with claim 5 wherein said stationary hub is provided with an inner annular recess and said hollow axle is retained in said stationary hub by means of a ring nut situated within said recess and threadedly engaging the innermost end of said hollow axle.

* * * * *